United States Patent
Tajiri

(10) Patent No.: US 9,581,887 B2
(45) Date of Patent: Feb. 28, 2017

(54) LIGHT SOURCE DEVICE AND DISPLAY DEVICE

(71) Applicant: Sony Corporation, Tokyo (JP)

(72) Inventor: Shinichiro Tajiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 131 days.

(21) Appl. No.: 14/205,405

(22) Filed: Mar. 12, 2014

(65) Prior Publication Data

US 2014/0285774 A1 Sep. 25, 2014

(30) Foreign Application Priority Data

Mar. 22, 2013 (JP) .................. 2013-060364

(51) Int. Cl.
*G03B 21/28* (2006.01)
*G03B 21/20* (2006.01)

(52) U.S. Cl.
CPC ........... *G03B 21/28* (2013.01); *G03B 21/204* (2013.01); *G03B 21/208* (2013.01); *G03B 21/2066* (2013.01)

(58) Field of Classification Search
CPC .... G03B 21/14; G03B 21/204; H04N 9/3114; H04N 9/3161; H04N 9/3197

USPC ........ 353/30, 31, 84, 85, 94, 98, 99; 362/84, 362/231, 249.02, 284, 800

See application file for complete search history.

(56) References Cited

U.S. PATENT DOCUMENTS

| | | | |
|---|---|---|---|
| 9,004,701 B2* | 4/2015 | Berben et al. ................... | 353/99 |
| 2003/0039036 A1* | 2/2003 | Kruschwitz ........ | G02B 27/0927 359/707 |
| 2011/0013145 A1* | 1/2011 | Kato .................. | G02B 27/0994 353/20 |
| 2011/0164294 A1* | 7/2011 | Shimizu ............. | G02B 27/0172 359/13 |
| 2012/0268503 A1* | 10/2012 | Sugiyama et al. ............ | 345/690 |
| 2013/0038847 A1* | 2/2013 | Katou .............. | 353/98 |
| 2013/0050654 A1* | 2/2013 | Hu et al. ......................... | 353/31 |

FOREIGN PATENT DOCUMENTS

JP  2012-108486  6/2012

* cited by examiner

*Primary Examiner* — Sultan Chowdhury
(74) *Attorney, Agent, or Firm* — Chip Law Group

(57) ABSTRACT

There is provided a light source device including at least one light source configured to emit light, a diffusion plate configured to diffuse and reflect the light emitted from the light source, and a partial transmission member which is provided between the light source and the diffusion plate and has a transmission region which allows the light to pass through and a reflection region which reflects the light and is except the transmission region.

14 Claims, 13 Drawing Sheets

LIGHT SOURCE DEVICE AND DISPLAY DEVICE

CROSS REFERENCE TO RELATED APPLICATIONS

This application claims the benefit of Japanese Priority Patent Application JP 2013-060364 filed Mar. 22, 2013, the entire contents of which are incorporated herein by reference.

BACKGROUND

The present disclosure relates to a light source device used for a display device such as a projector and a display device including the same.

A light source for a projector mainly employs an extra-high pressure mercury lamp in view of brightness and cost performance, and meanwhile, a solid-state light source, which has long service life and wide color gamut, has attention in view of the long service life and additional high functions. The solid-state light source is a light source utilizing light emission from a p-n junction of semiconductor, such as an LED and a laser diode (LD). Recently, for example, as in JP 2012-108486A, a light source device is used for a projector in which device the solid-state light source irradiates, with light, a fluorescent material which is irradiated with the light in a specific wavelength region to emit light in a different wavelength region and the resulting fluorescent emission light is utilized.

SUMMARY

When lasers are used for a light source of a projector, the beams of the light source are desirable to have its cross-sectional area to some extent. When a considerable number of lasers are used for the light source, arrangement of the lasers into an array satisfies such a cross-sectional area. However, when a little number of lasers are used, incapability of overlapping the light rays with one another in a multiple manner causes strong coherence and expects the diameter of the beams to be widened in any method.

As one configuration for this, for example, FIG. 17 illustrates a light source device 10A in which a transmissive diffusion plate 12 is irradiated with light rays from a laser diode 11 which are diffused, and after that, are emitted to be in desired specifications with an optical system including a lens 13, a mirror 14 and the like. Moreover, as illustrated in FIG. 18, there is also a light source device 10B using a reflective diffusion plate 17 in order to allow the whole light source to be small. In the light source device 10B, the light emitted from the laser diode 11 passes through a polarization beam splitter (PBS) 15, a λ/4 plate 16 and the lens 13 and is diffused and reflected on the reflective diffusion plate 17. The light reflected on the reflective diffusion plate 17 passes through the lens 13 and the λ/4 plate 16 and reflected on the PBS 15 to be emitted.

However, compared with the light source device 10A using the transmissive diffusion plate 12, for the light source 10B using the reflective diffusion plate 17, the PBS 15 and the λ/4 plate 16 which are relatively expensive optical systems are newly wanted, causing an increase of the number of components and high production costs of the light source device 10B. Therefore, the light source device has been desired to be small without using an expensive component.

According to an embodiment of the present disclosure, there is provided a light source device including at least one light source configured to emit light, a diffusion plate configured to diffuse and reflect the light emitted from the light source, and a partial transmission member which is provided between the light source and the diffusion plate and has a transmission region which allows the light to pass through and a reflection region which reflects the light and is except the transmission region.

According to the present disclosure, a configuration of reflecting and diffusing light emitted from a light source with a diffusion plate employs a partial transmission member which is provided between the light source and the diffusion plate and has a transmission region and a reflection region. The light emitted from the light source passes through the transmission region and is incident on the diffusion plate to be diffused and reflected thereon. The light reflected with the diffusion plate is reflected on the reflection region of the partial transmission member in the emission direction of the light of the light source device. Thereby, the amount of the light emitted from the light source device can be maintained and the light source device can be small.

According to an embodiment of the present disclosure, there is provided a display device including a light source unit, a light modulating/combining system configured to modulate and combine incident light, an illumination optical system configured to guide light emitted from the light source unit to the light modulating/combining system, and a projection optical system configured to perform projection of an image emitted from the light modulating/combining system. The light source unit includes at least one light source configured to emit light, a diffusion plate configured to diffuse and reflect the light emitted from the light source, and a partial transmission member which is provided between the light source and the diffusion plate and has a transmission region which allows the light to pass through and a reflection region which reflects the light and is except the transmission region.

As described above, according to the present disclosure, a light source device can be attained to be small without using an expensive component.

DETAILED DESCRIPTION OF THE EMBODIMENTS

Figure 1:
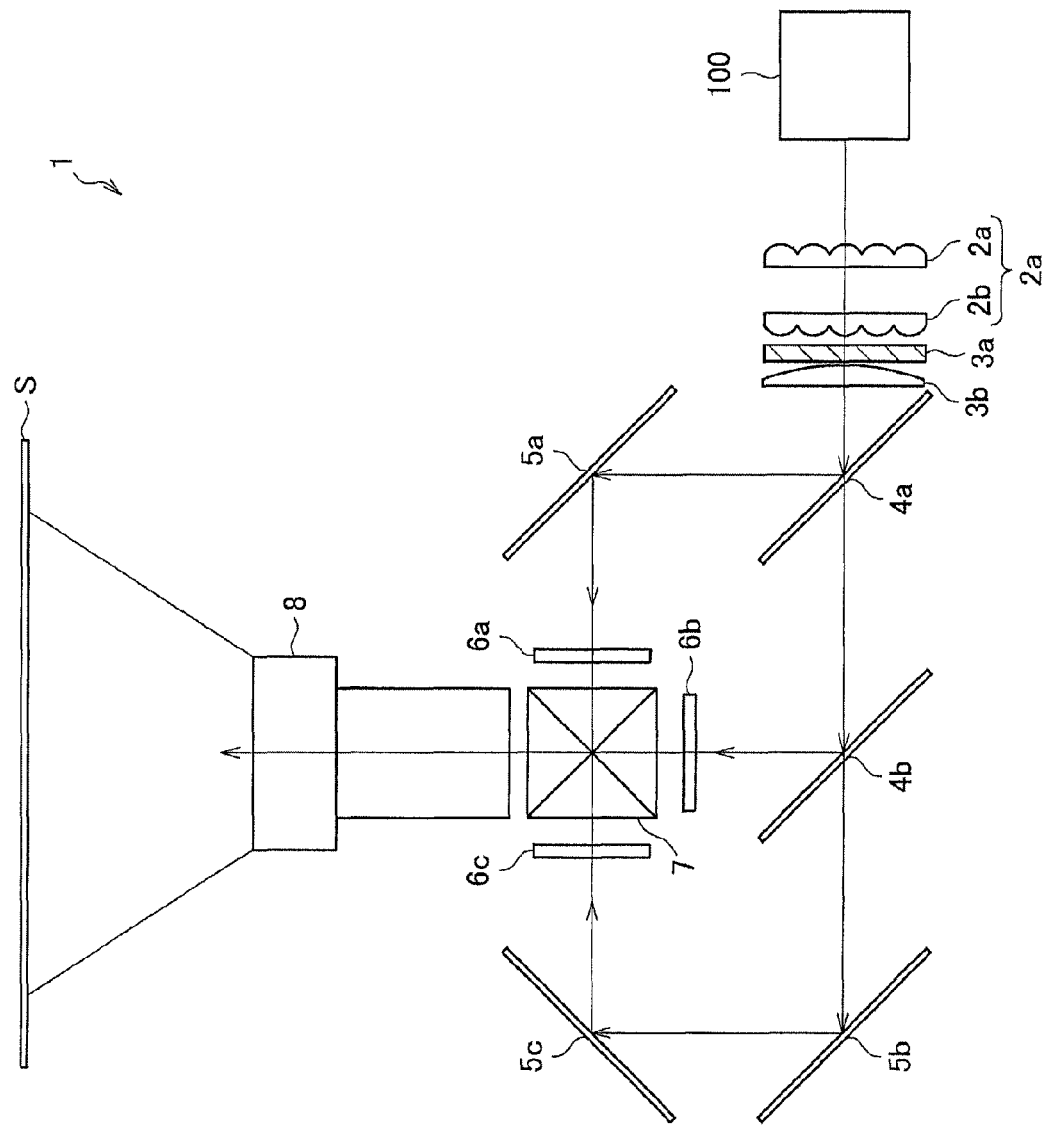
FIG. 1 is a schematic configuration diagram illustrating one exemplary configuration of a display device including a light source unit according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Incidentally, the description is made in the following order.
1. First Embodiment (Configuration with Transmission Region of Partial Transmission Plate in Center Part)
   1.1. Configuration of Display Device
   1.2. Configuration of Light Source Unit
2. Second Embodiment (Configuration with Transmission Region of Partial Transmission Plate in Corner Part)
3. Third Embodiment (Configuration with Diffusion Plate Having Ranbashian Characteristics)
4. Fourth Embodiment (Configuration with Two LDs)
5. Fifth Embodiment (Configuration with Diffusion Plate to be Rotated (Transmission Region in Center Part of Partial Transmission Plate))
6. Sixth Embodiment (Configuration with Diffusion Plate to be Rotated (Transmission Region in Corner Part of Partial Transmission Plate))
7. Seventh Embodiment (Configuration Partially with Diffusion Plate to be Rotated)
8. Eighth Embodiment (Configuration with Diffusion Plate Having Ranbashian Characteristics to be Rotated)
9. Ninth Embodiment (Configuration Using Fluorescent Material)

<1. First Embodiment>
[1.1. Configuration of Display Device]

First, referring to FIG. 1, one exemplary configuration of a display device 1 including a light source unit 100 according to a first embodiment of the present disclosure is described. FIG. 1 is a schematic configuration diagram illustrating one exemplary configuration of the display device 1 including the light source unit 100 according to the embodiment.

The display device 1 according to the embodiment represents one exemplary configuration of a projector for collecting light from a light source which emits the light, emitting the light from a projection lens through a device causing display of an image, and projecting the image on a display plane such as a screen S. The display device 1 illustrated in FIG. 1 is one exemplary configuration of a projector using 3 LCDs as microdisplays.

Light emitted from the light source unit 100 passes through an integrator lens 2 constituted of a first lens array 2a and a second lens array 2b in order to maintain its brightness still at the edges of the display image, after that, passes through a polarization conversion element 3a and a condenser lens 3b, and is separated into components for individual wavelength regions.

The light having passed through the condenser lens 3b is incident on a first reflection dichroic minor 4a reflecting only the light in the red wavelength region and allowing the light in the other wavelength regions to pass through. Thereby, the light in the red wavelength region is reflected by the first reflection dichroic minor 4a and proceeds toward a reflection minor 5a. The light in the red wavelength region is further reflected by the reflection mirror 5a and is incident on a red liquid crystal panel 6a.

The light in the other wavelength regions having passed through the first reflection dichroic mirror 4a is incident on a second reflection dichroic mirror 4b. The second reflection dichroic minor 4b reflects only the light in the green wavelength region and allows the light in the other wavelength region, that is, the light in the blue wavelength region to pass through. The light in the green wavelength region reflected by the second reflection dichroic minor 4b is incident on a green liquid crystal panel 6b. Moreover, the light in the blue wavelength region having passed through the second reflection dichroic minor 4b is reflected by reflection mirrors 5b and 5c, and after that, is incident on a blue liquid crystal panel 6c.

Each of the liquid crystal panels 6a to 6c for the individual colors modulates the light incident on each of those according to an input image signal, and generates signal light of the image corresponding to each of R, G and B. For the liquid crystal panels 6a to 6c, for example, transmissive liquid crystal elements using high temperature polysilicon TFTs may be employed. The signal light obtained by the modulation with each of the liquid crystal panels 6a to 6c is allowed to be incident on a dichroic prism 7 and the individual components thereof are combined with one another. The dichroic prism 7 is formed into a rectangular solid with four triangular prisms to reflect the red signal light and the blue signal light but to allow the green signal light to pass through. The signal light for the colors obtained by the combining with the dichroic prism 7 is incident on a projection lens 8 to be projected on the display plane of the screen S or the like as an image.

In the display device 1, the liquid crystal panels 6a to 6c and the dichroic prism 7 function as a light modulating/ combining system for modulating and combining the incident light. Moreover, the integrator lens 2, the polarization conversion element 3a, the condenser lens 3b, the reflection dichroic minors 4a and 4b and the reflection minors 5a to 5c function as an illumination optical system for guiding the light from the light source unit 100 to the liquid crystal panels 6a to 6c constituting the light modulating/combining system. Furthermore, the projection lens 8 functions as a projection optical system for projecting the image emitted from the dichroic prism 7.

[1.2. Configuration of Light Source Unit]

Figure 2:
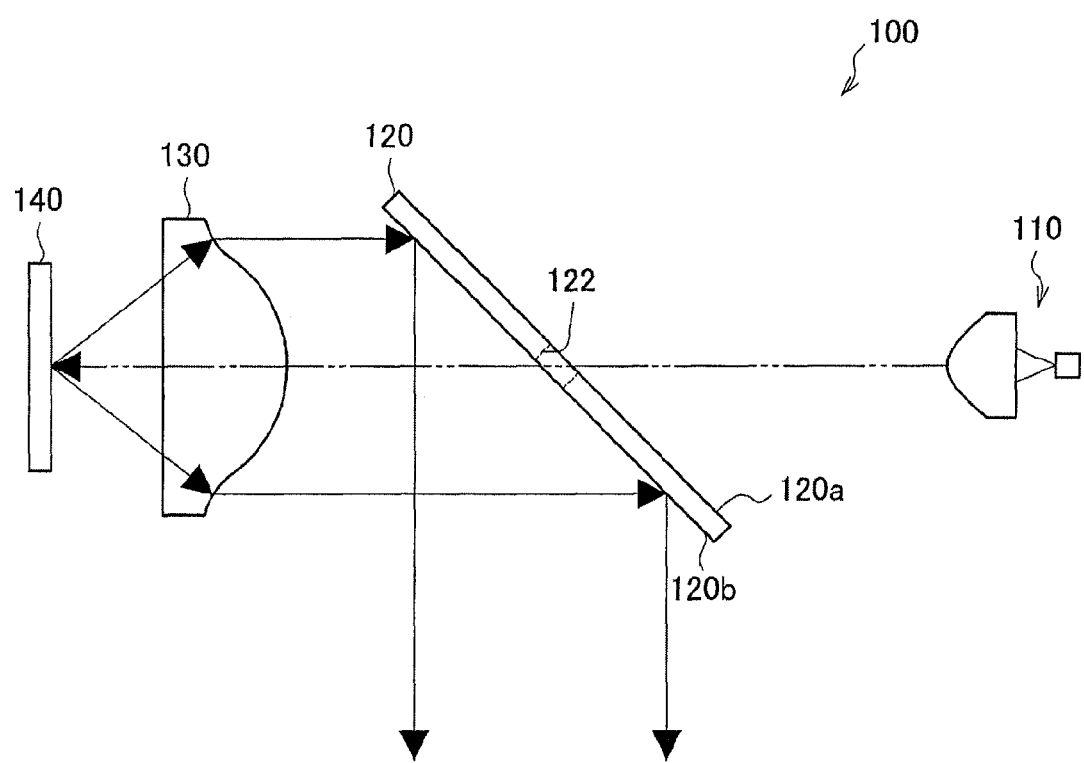
FIG. 2 is a schematic explanatory drawing illustrating one exemplary configuration of the light source unit according to the embodiment.

As the light source unit 100 of such a display device 1, in the present technology as illustrated in FIG. 2, a light source device is employed which emits the light configured into desired specifications using a reflective diffusion plate. The light source unit 100 is constituted of a laser diode (hereinafter also referred to as "LD") 110, a partial transmission plate 120, a lens 130 and a diffusion plate 140. The LD 110 and the lens 130 are arranged such that their optical axes coincide with each other. In addition, the optical axis is an axis which passes through the center of the partial transmission plate 120 and is parallel to the emission direction of the light of the LD 110. The partial transmission plate 120 is disposed between the LD 110 and the lens 130 and the diffusion plate 140 is disposed opposite to the partial transmission plate 120 relative to the lens 130.

The LD 110 is a light emission part emitting light leading to the light emitted from the light source unit 100. The light emitted from the LD 110 proceeds toward the partial transmission plate 120.

The partial transmission plate 120 is an optical system (partial transmission member) for allowing the incident light from the LD 110 to pass through a transmission region toward the diffusion plate 140 and guiding the light diffused by the diffusion plate 140 to the emission direction of the light of the light source unit 100. In the partial transmission plate 120, a first plane 120a is a plane on the side on which the light is incident from the LD 110 and a second plane 120b is a plane opposite to the first plane 120a. In the partial transmission plate 120 according to the embodiment, an opening part 122 is formed as the transmission region allowing the incident light from the LD 110 to pass through.

Figure 3:
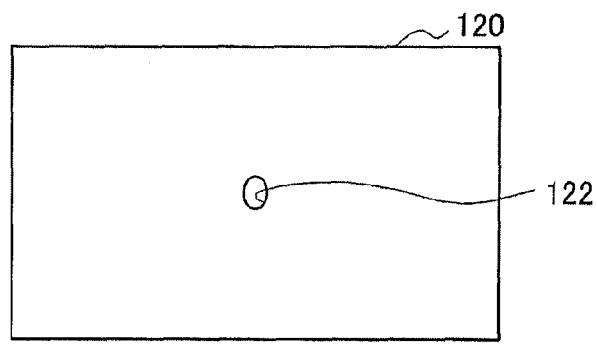
FIG. 3 is a plan view illustrating one example of a partial transmission plate of the light source unit according to the embodiment.
Figure 4:
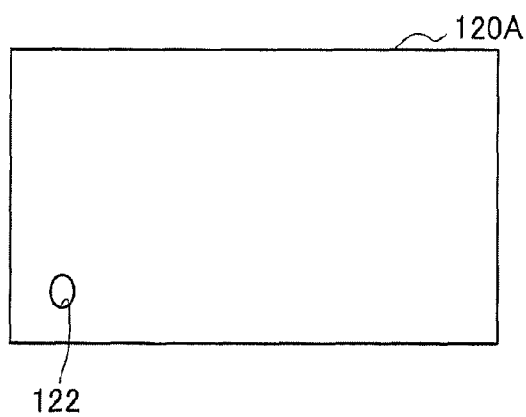
FIG. 4 is a plan view illustrating another example of the partial transmission plate of the light source unit according to the embodiment.
Figure 5:
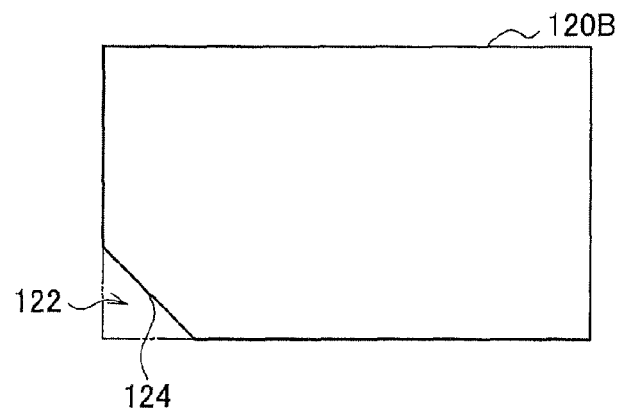
FIG. 5 is a plan view illustrating one example of the partial transmission plate of the light source unit according to the embodiment in which an opening part is formed as a notch.

The opening part 122 is formed at the incident position of the light from the LD 110. For example, in the case of the light source unit 100 illustrated in FIG. 2, it may be formed in the substantial center part of the partial transmission plate 120 as illustrated in FIG. 3. The opening part 122 may also be formed, for example, in a corner part of a partial transmission plate 120A as illustrated in FIG. 4 according to the incident position of the light. The opening part 122 may be a physical opening as in the partial transmission plate 120 according to the embodiment or may be formed of transmission material such as glass that allows the light to pass through only in the transmission region. Otherwise, it may be formed by applying coating, which allows the light to pass through, only in the transmission region on the partial transmission plate 120. Moreover, the shape of the opening part 122 may be circular as illustrated in FIG. 3 or may be polygonal. Otherwise, as illustrated in FIG. 5, the opening part 122 may be formed by providing a notch 124 at the corner of a partial transmission plate 120B.

The light that has passed through the opening part 122 of the partial transmission plate 120 and is reflected with the diffusion plate 140 is reflected on the second plane 120b of the partial transmission plate 120 in the emission direction of the light of the light source unit 100. In the embodiment, since the emission direction of the light source unit 100 is substantially normal to the incident direction of the light from the LD 110, the partial transmission plate 120 is disposed to incline by approximately 45° relative to the incident direction of the light from the LD 110.

Herein, when the opening area of the opening part 122 (passing region) is too large, the reflected light from the diffusion plate 140 passes through it toward the LD 110, this causing the light amount of the light source unit 100 to decrease. Therefore, the opening part 122 is formed to be as small as possible corresponding to the region on the partial transmission plate 120 which is illuminated with the incident light from the LD 110. The opening area of the opening part 122 is made as small as possible in order to cause the reflected light from the diffusion plate 140 to proceed toward the LD 110 to as less an extent as possible. Thereby, the light amount of the light source unit 100 is maintained. Accordingly, when the LD 110 is allowed to have as short a focal length as possible to emit a fine beam, the opening area of the opening part 122 can be made smaller.

The lens 130 is an optical system for collecting the light from the LD 110 on the diffusion plate 140 and guiding the reflected light with the diffusion plate 140 to the partial transmission plate 120. The light having passed through the opening part 122 of the partial transmission plate 120 passes through the lens 130 to be guided to the diffusion plate 140. The lens 130 is disposed, for example, such that the focus of the lens positions on the diffusion plate 140. The light from the LD 110 is collected at one point on the diffusion plate 140, and thereby, the light undergoes diffuse reflection at the condensing point of the diffusion plate 140 to be returned to the lens 130.

Since the light having undergone diffuse reflection with the diffusion plate 140 is dispersed from the focus position of the lens 130, it passes through the lens 130 to be parallel light. After that, the parallel light is reflected on a reflection part of the second plane 120b of the partial transmission plate 120 (that is, a part other than the opening part 122 which is the transmission region). At this stage, a part of the reflected light passes through the opening part 122 of the partial transmission plate 120 to proceed toward the LD 110. Nevertheless, this does not cause large loss of the light amount since the opening part 122 is small enough relative to the reflection part.

The diffusion plate 140 is a reflective diffusion plate for diffusing and reflecting the light incident from the LD 110. The diffusion of the light with the diffusion plate 140 is based on scattering and diffraction. The diffusion plate 140 is configured, for example, by forming fine roughness on the surface on which a metal film is provided and conducts scattering reflection on the light incident on the roughness plane. The diffusion plate 140 is disposed, for example, at the focus position of the lens 130 such that the light reflected on the diffusion plate 140 is returned to the lens 130.

Figure 18:
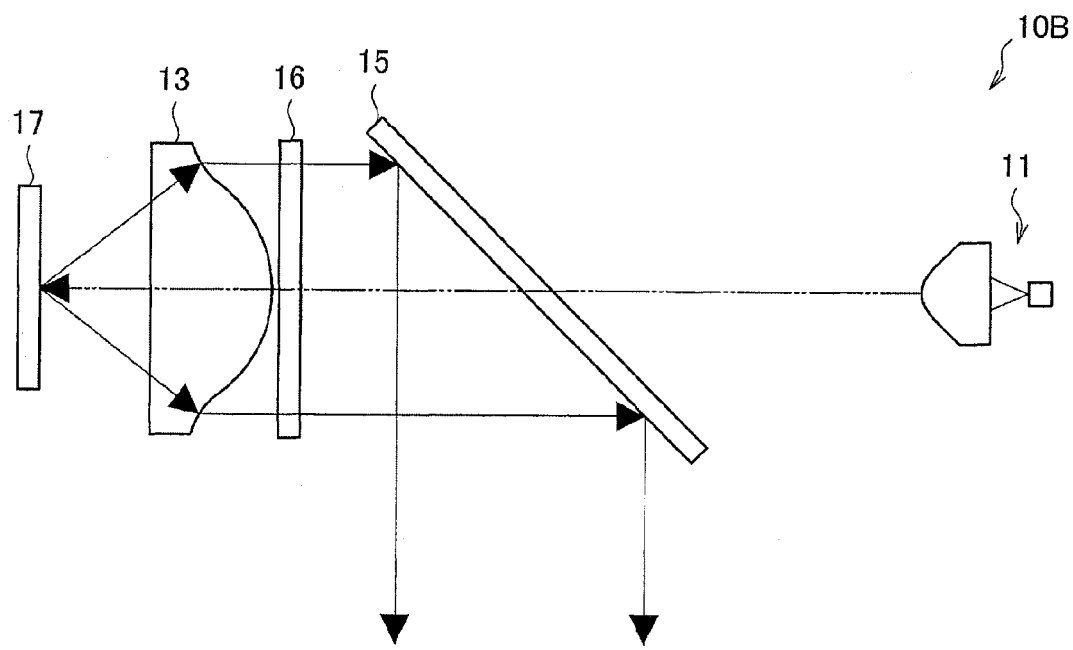
FIG. 18 is a schematic configuration diagram illustrating one exemplary configuration of a light source device using a reflective diffusion plate according to the related art to the present disclosure.

Such a configuration can attain the light source unit 100 using a reflective diffusion plate easy to be small, preventing usage of expensive components such as the PBS 15 and the λ/4 plate 16 as illustrated in FIG. 18 and reducing the number of components.

<2. Second Embodiment>

Figure 6:
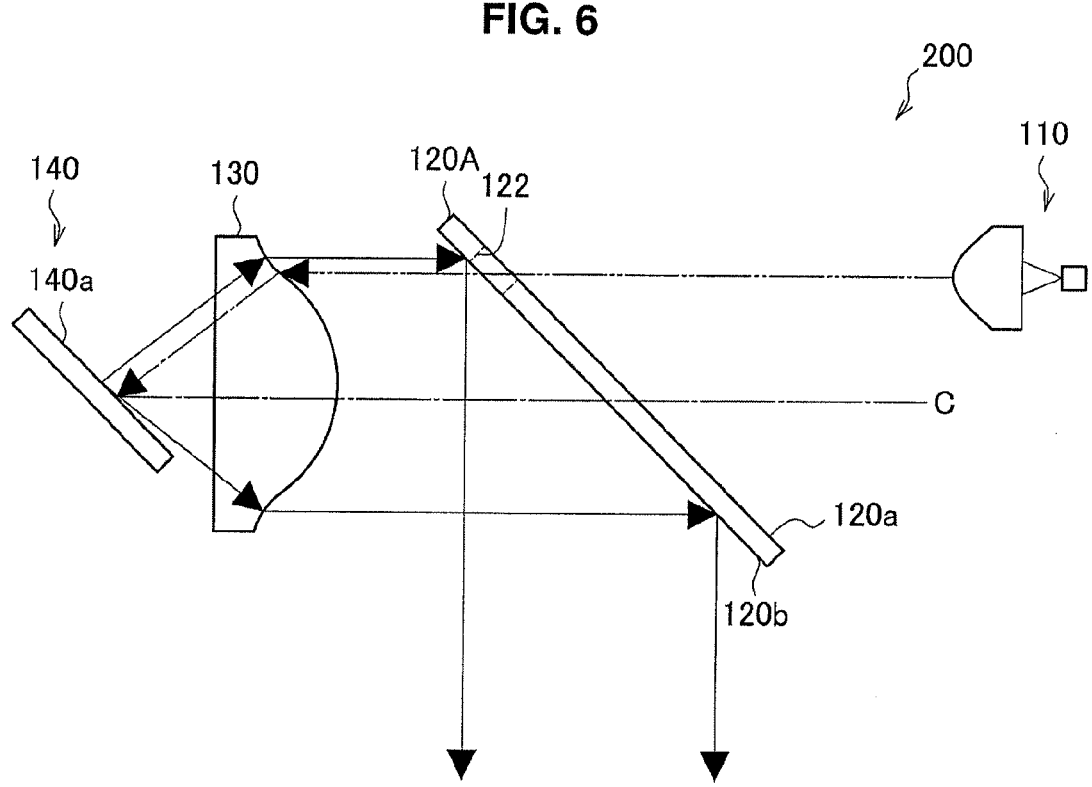
FIG. 6 is a schematic explanatory drawing illustrating one exemplary configuration of a light source unit according to a second embodiment of the present disclosure.
Figure 7:
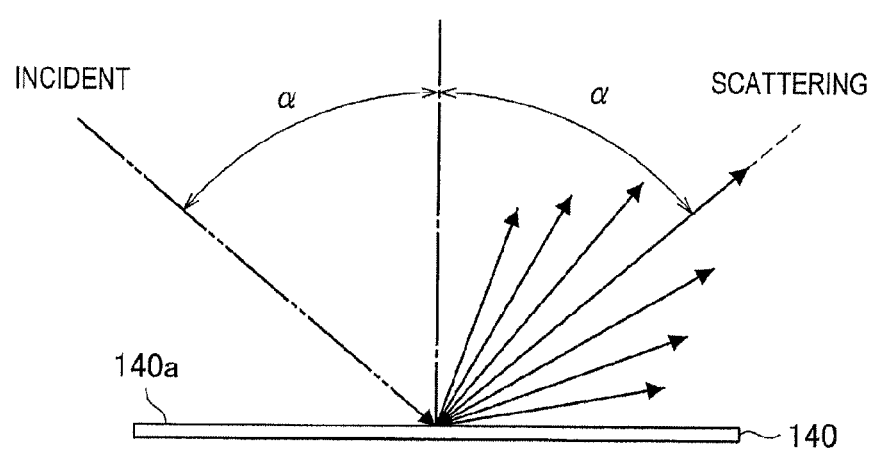
FIG. 7 is an explanatory drawing of general scattering reflection on a diffusion plate.

Next, based on FIG. 6 and FIG. 7, a light source unit 200 according to a second embodiment is described. In addition, FIG. 6 is a schematic configuration diagram illustrating the light source unit 200 according to the embodiment. FIG. 7 is an explanatory drawing illustrating general scattering reflection with the diffusion plate 140.

In the light source unit 100 according to the first embodiment illustrated in FIG. 2, the opening part 122 on which the incident light from the LD 110 is incident is formed close to the optical axis of the light source unit 100 and the light which is from the LD 110 and has passed through the partial transmission plate 120 is incident on the diffusion plate 140. Then, the reflected light with the diffusion plate 140 is reflected again with the partial transmission plate 120.

Herein, the light rays having undergone scattering reflection with the diffusion plate 140 have, as illustrated in FIG. 7, strong intensity in the direction with the same reflection angle as the incident angle $\alpha$ of the incident light on the diffusion plane 140*a* of the diffusion plate 140 (inclination angle relative to the axis normal to the diffusion plane 140*a*), as in the case of general mirror reflection. In the case of the light source unit 100, the reflection direction a is the same direction as the incident direction because the incident angle is 0. In such a case, when the reflected light from the diffusion plate 140 is reflected on the second plane 120*b* of the partial transmission plate 120, the light rays large in intensity of the scattering reflection are incident into the opening part 122, this causing the loss not to be reflected on the partial transmission plate 120.

In order to prevent this, for example, it can be considered that the LD 110 and the opening part 122 of the partial transmission plate 120A are provided at positions with a bias from the optical axis of the light source unit to configure the light source unit, so that the light is incident obliquely on the diffusion plate 140. However, in this case, the intensity distribution of the light emitted from the LD 110 is shifted off the optical axis center and this can cause illumination unevenness.

Therefore, as illustrated in FIG. 6, the light source unit 200 according to the embodiment has a configuration in which the LD 110 and the opening part 122 of the partial transmission plate 120A are provided at positions with a bias from an optical axis C of the light source unit 200 and the diffusion plate 140 is disposed with an inclination. Namely, the light emitted from the LD 110 passes through the opening part 122 of the partial transmission plate 120A and is incident on a diffusion plane 140*a* of the diffusion plate 140 with the lens 130. The diffusion plate 140 is disposed with an inclination such that the part of light rays large in reflection intensity of the reflected light on the diffusion plane 140*a* substantially coincides with the optical axis C of the light source unit 200.

Accordingly, the part that is large in reflection intensity out of the reflected light on the diffusion plane 140*a* proceeds along the optical axis C to pass through the lens 130 and is incident on the reflection part of the partial transmission plate 120A to be guided to the emission direction of the light of the light source unit 200. Thereby, the light source unit 200 can be attained to be small, loss of the light in the partial transmission plate 120A can be small and illumination unevenness can be reduced.

<3. Third Embodiment>

Figure 8:
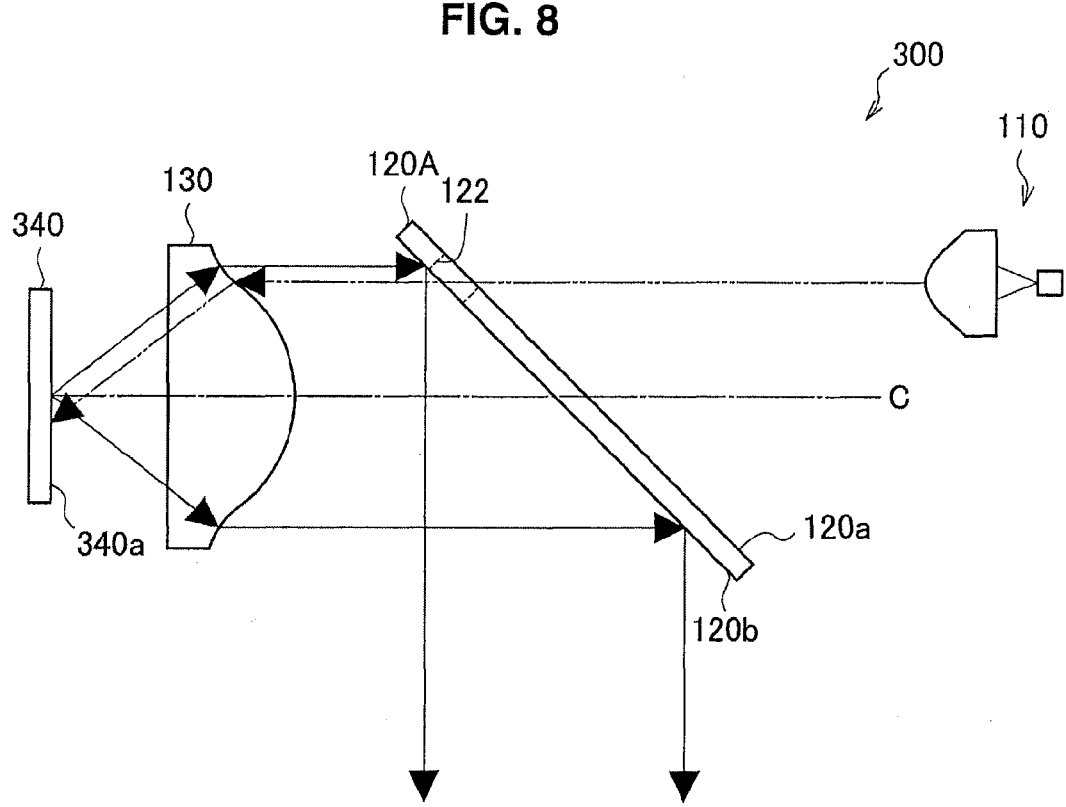
FIG. 8 is a schematic explanatory drawing illustrating one exemplary configuration of a light source unit according to s third embodiment of the present disclosure.
Figure 9:
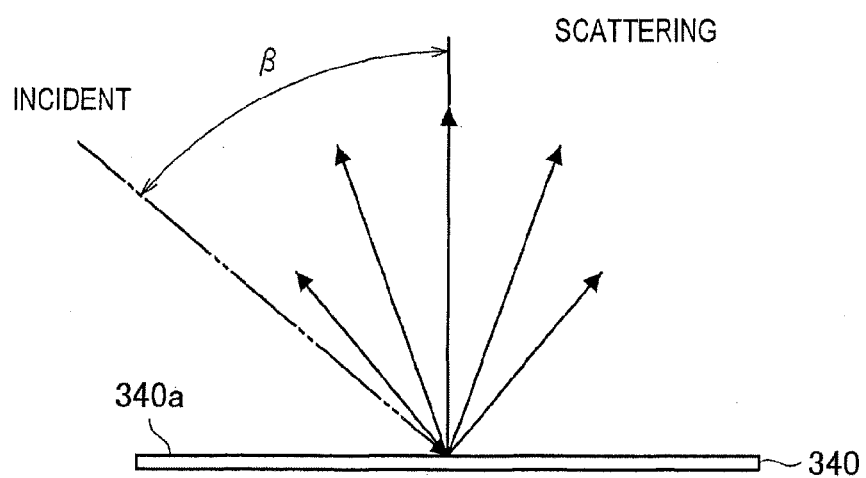
FIG. 9 is an explanatory drawing of scattering reflection on a diffusion plate having Ranbashian characteristics.

Next, based on FIG. 8 and FIG. 9, a light source unit 300 according to a third embodiment is described. In addition, FIG. 8 is a schematic configuration diagram illustrating the light source unit 300 according to the embodiment. FIG. 9 is an explanatory drawing illustrating scattering reflection on the diffusion plate 340 having Ranbashian characteristics.

The light source unit 300 according to the embodiment is different in the diffusion plate 340 having Ranbashian characteristics compared with the second embodiment. Namely, as illustrated in FIG. 8, in the light source unit 300, the LD 110 and the opening part 122 of the partial transmission plate 120A are disposed at positions with a bias from the optical axis C in order to suppress loss of the reflected light in the partial transmission plate 120A similarly to the second embodiment. Meanwhile, in the diffusion plate 340, the diffusion plane 340*a* for the light is disposed to be normal to the optical axis C similarly to the diffusion plate 140 according to the first embodiment illustrated in FIG. 2. Accordingly, the incident light having passed through the opening part 122 passes through the lens 130 to be incident obliquely on the diffusion plane 340*a* of the diffusion plate 340.

The diffusion plate 340 according to the embodiment has Ranbashian characteristics as illustrated in FIG. 9. The Ranbashian characteristics are the characteristics in which the center of intensity is in the normal direction to the reflection plane (diffusion plane 340*a*) regardless of the incident angle of the light and the intensity of light rays reflected in the direction at an angle $\beta$ relative to the normal direction attenuates proportional to $\cos\beta$. In addition, in the present technology, the characteristics do not necessarily meet the strict Ranbashian characteristics as above but they only have to provide a part large in reflection intensity in the normal direction to the reflection plane regardless of the incident angle.

Using the diffusion plate 340 having such Ranbashian characteristics allows a part large in reflection intensity out of the reflected light on the diffusion plane 340*a* to proceed along the optical axis C even when the light from the LD 110 is incident obliquely on the diffusion plate 340. Then, the light rays large in reflection intensity pass through the lens 130 and are incident on the reflection part of the partial transmission plate 120A to be guided to the emission direction of the light of the light source unit 300. Thereby, the light source unit 300 can be attained to be small, loss of the light in the partial transmission plate 120A can be small and illumination unevenness can be reduced.

<4. Fourth Embodiment>

Figure 10:
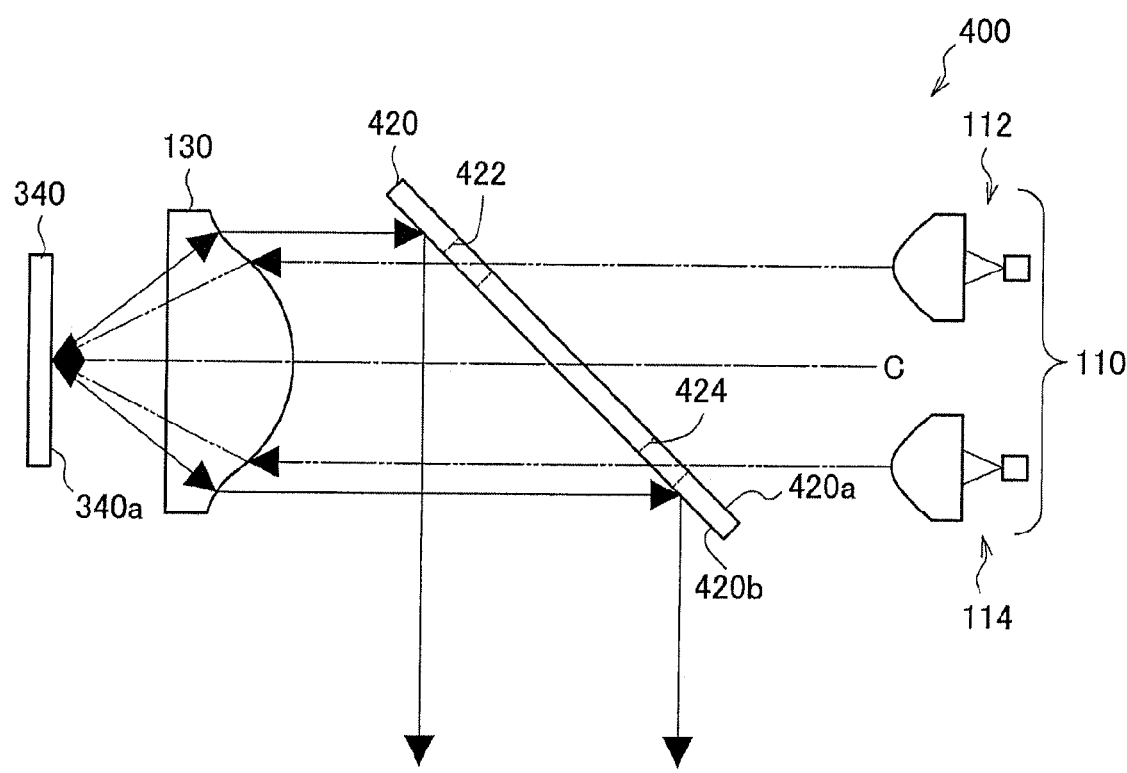
FIG. 10 is a schematic explanatory drawing illustrating one exemplary configuration of a light source unit according to a fourth embodiment of the present disclosure.
Figure 11:
FIG. 11 is a plan view illustrating one example of a partial transmission plate of the light source unit according to the embodiment which has two opening parts.

Next, based on FIG. 10 and FIG. 11, a light source unit 400 according to a fourth embodiment is described. In addition, FIG. 10 is a schematic configuration diagram illustrating the light source unit 400 according to the embodiment. FIG. 11 is a plan view of a partial transmission plate 420 having two opening parts 422 and 424.

The light source unit 400 according to the embodiment is different in two LDs 112 and 114 included as the LD 110 which is a light emission part compared with the third embodiment. Also in the case of the two LDs 112 and 114 being included, the diffusion plate 340 having Ranbashian characteristics used for the light source unit 300 according to the third embodiment is employed, and thereby, the light rays large in reflection intensity out of the reflected light on the diffusion plate 340 are readily allowed to proceed along the optical axis C.

As illustrated in FIG. 10, the two LDs 112 and 114 are disposed at positions with biases from the optical axis C of the light source unit 400. The light emitted from the LDs 112 and 114 is incident on the first plane 420*a* of the partial transmission plate 420. In the partial transmission plate 420 according to the embodiment, as illustrated in FIG. 11, two opening parts 422 and 424 are formed as the transmission regions at positions corresponding to the incident positions from the respective LDs 112 and 114.

The light which has passed through the opening parts 422 and 424 of the partial transmission plate 420 and is reflected on the diffusion plate 340 is reflected on the second plane 420*b* of the partial transmission plate 420 in the emission direction of the light of the light source unit 100. In the embodiment, since the emission direction of the light source unit 400 is substantially perpendicular to the incident direction of the light from the LDs 112 and 114, the partial transmission plate 420 is disposed to incline by approximately 45° relative to the incident direction of the light from the LDs 112 and 114.

Beams of the light having passed through the opening parts 422 and 424 are incident obliquely on the diffusion plane 340a of the diffusion plate 340 via the lens 130. Since the diffusion plate 340 has Ranbashian characteristics, the light rays large in reflection intensity out of the beams of the light having undergone diffuse reflection on the diffusion plane 340a proceed along the optical axis C. Then, the light rays large in reflection intensity pass through the lens 130 and are incident on the reflection part of the partial transmission plate 420 to be guided in the emission direction of the light of the light source unit 400.

Thereby, the light source unit 400 can be attained to be small, loss of the light in the partial transmission plate 420 can be small and illumination unevenness can be reduced. Moreover, the diffusion plane 340a of the diffusion plate 340 is provided to be substantially perpendicular to the optical axis C, and thereby, the light rays large in reflection intensity out of the beams of the reflected light led from the light incident from the two LDs 112 and 114 are readily allowed to undergo reflection on the partial transmission plate 420 to be emitted from the light source unit 400.

<5. Fifth Embodiment>

Figure 12:
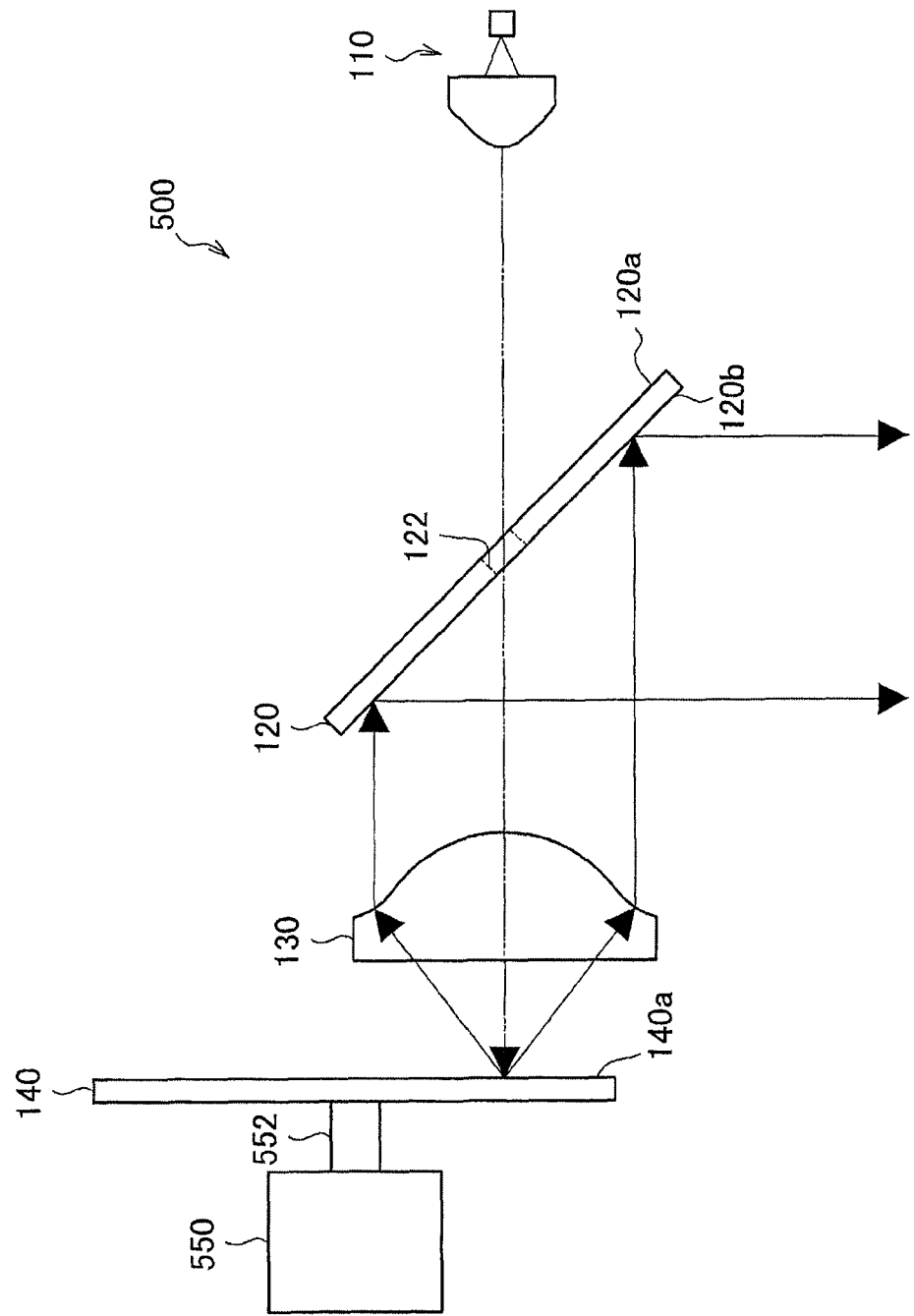
FIG. 12 is a schematic explanatory drawing illustrating one exemplary configuration of a light source unit according to a fifth embodiment of the present disclosure.

Next, based on FIG. 12, a light source unit 500 according to a fifth embodiment is described. In addition, FIG. 12 is a schematic configuration diagram illustrating the light source unit 500 according to the embodiment. The light source unit 500 according to the embodiment is different in the diffusion plate 140 rotatably provided with a rotating and driving unit 550 compared with the light source unit 100 according to the first embodiment.

The light emitted from the LD 110 has a property that the light has a uniform phase. Therefore, the light source using the light of the LD 110 can cause unevenness called speckles and/or interference fringes. Hence, the light source unit 500 according to the embodiment changes an in-plane brightness distribution of the diffused light in time by moving the diffusion plate 140. Thereby, the speckles and the interference fringes undergo averaging in time, this enabling the speckles and the interference fringes effectively to be reduced and image quality of the image displayed by the display device 1 using the light source unit 500 to be improved.

As a method of moving the diffusion plate 140, for example, a method in which the diffusion plate 140 formed to be in a wheel shape is rotated by the rotating and driving unit 550 such as a motor can be employed as illustrated in FIG. 12. A rotation shaft 552 of the rotating and driving unit 550 is attached to the substantial center part of the diffusion plate 140 and the rotation shaft 552 is rotated. Thereby, the diffusion plate 140 is rotated about the rotation shaft 552.

The light emitted from the LD 110 is incident on the first plane 120a side of the partial transmission plate 120 to pass through the opening part 122 and is collected on the diffusion plane 140a of the diffusion plate 140 with the lens 130. The light reflected on the diffusion plane 140a passes through the lens 130 again and is reflected on the second plane 120b of the partial transmission plate 120 to be guided in the emission direction of the light of the light source unit 500.

Such a configuration can attain the light source unit 500 using a reflective diffusion plate easy to be small, preventing usage of expensive components and reducing the number of components. Moreover, the diffusion plate 140 is rotated, this enabling speckles and interference fringes effectively to be reduced.

<6. Sixth Embodiment>

Figure 13:
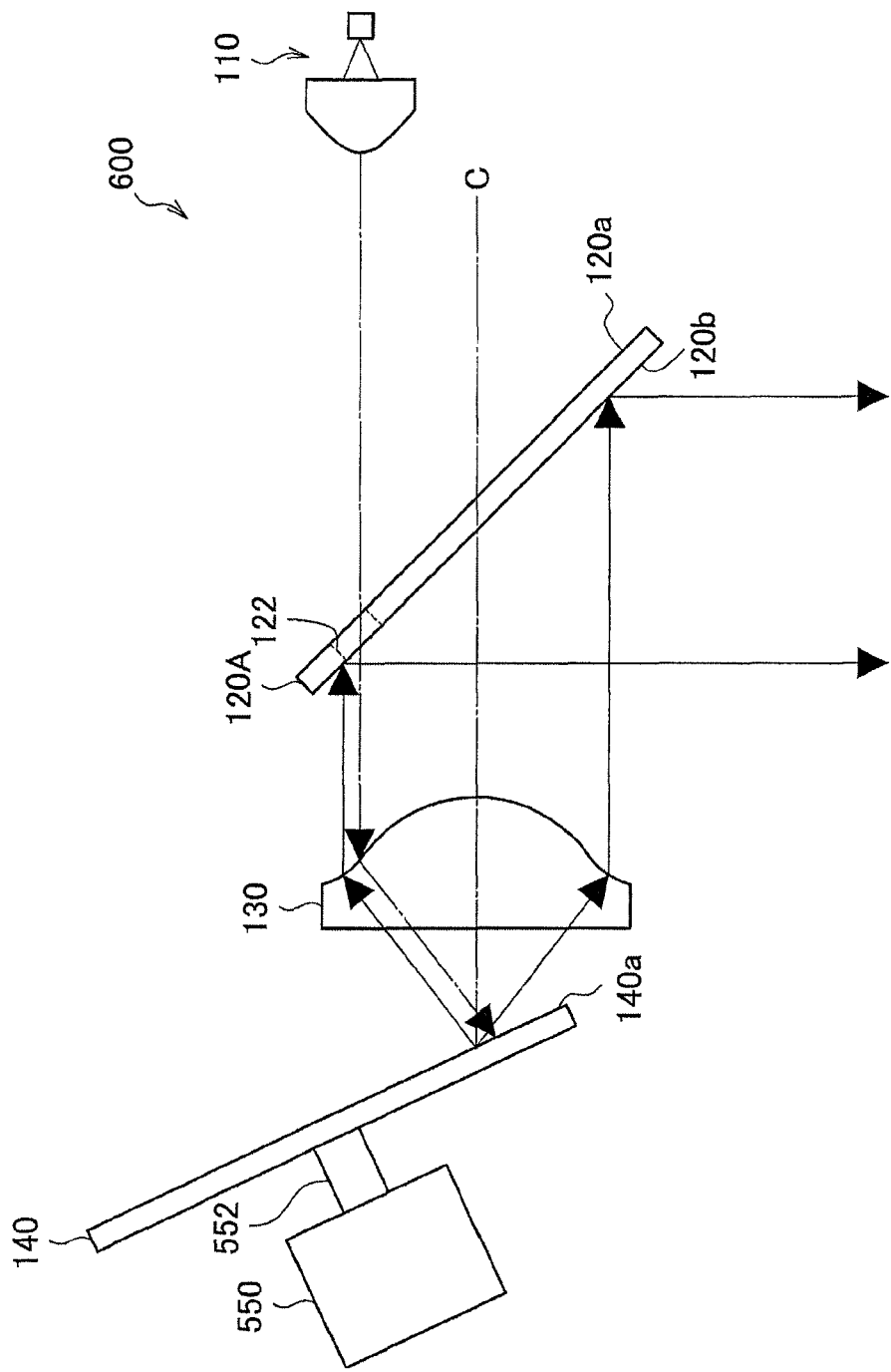
FIG. 13 is a schematic explanatory drawing illustrating one exemplary configuration of a light source unit according to a sixth embodiment of the present disclosure.

Next, based on FIG. 13, a light source unit 600 according to a sixth embodiment is described. In addition, FIG. 13 is a schematic configuration diagram illustrating the light source unit 600 according to the embodiment. The light source unit 600 according to the embodiment is different in the diffusion plate 140 rotatably provided with the rotating and driving unit 550 compared with the light source unit 200 according to the second embodiment.

Also in the light source unit 600 according to the embodiment, the diffusion plate 140 is rotated by the rotating and driving unit 550 similarly to the fifth embodiment. This can attain the light source unit 600 to be small, loss of the light in the partial transmission plate 120A can be small and illumination unevenness can be reduced. Additionally, speckles and interference fringes can also be reduced effectively.

<7. Seventh Embodiment>

Figure 14:
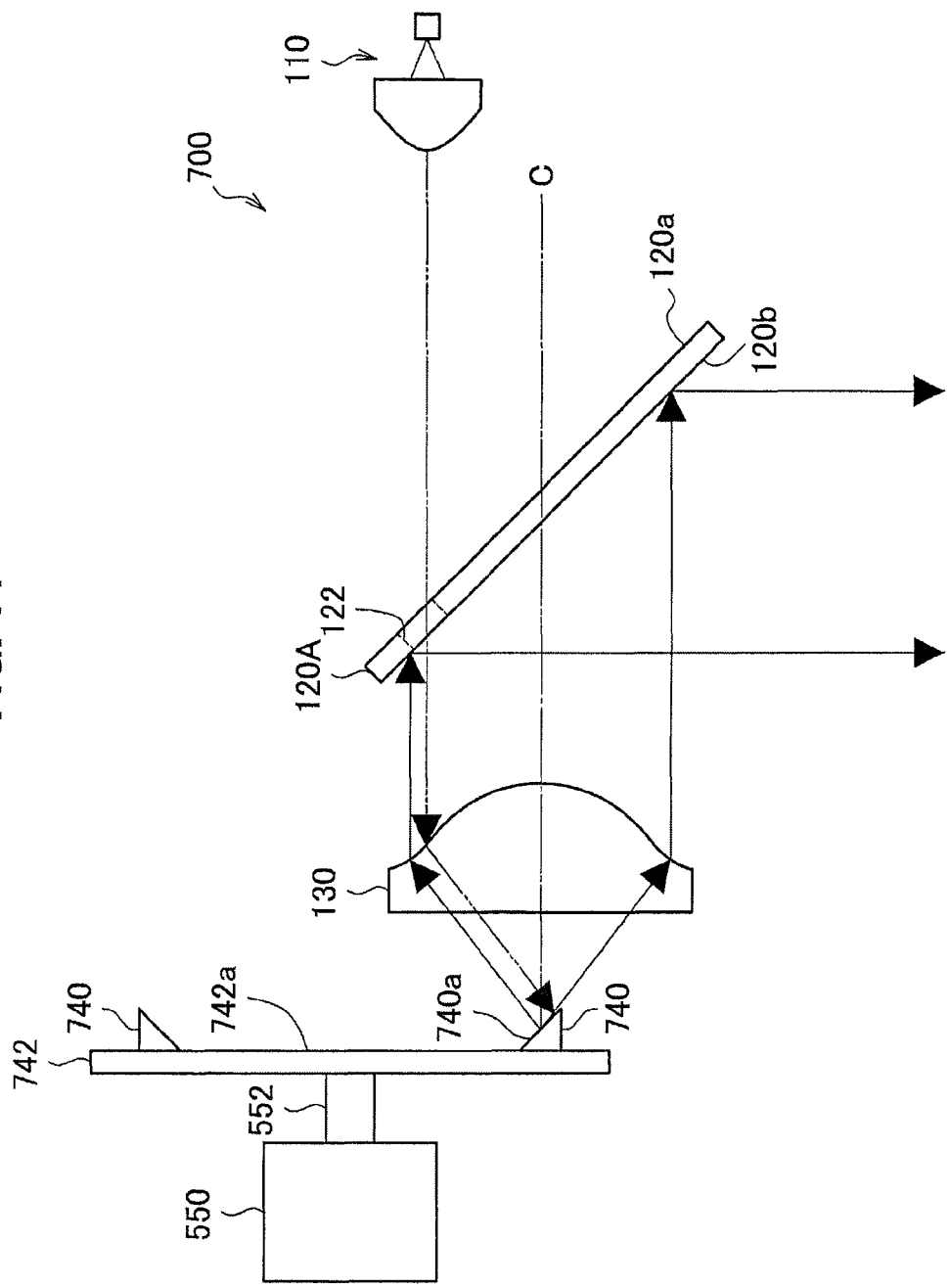
FIG. 14 is a schematic explanatory drawing illustrating one exemplary configuration of a light source unit according to a seventh embodiment of the present disclosure.

Next, based on FIG. 14, a light source unit 700 according to a seventh embodiment is described. In addition, FIG. 14 is a schematic configuration diagram illustrating the light source unit 700 according to the embodiment. The light source unit 700 according to the embodiment is different in configuration of a diffusion plate 740 compared with the light source unit 600 according to the sixth embodiment. Namely, while the diffusion plate 140 is disposed to incline relative to the optical axis C in the light source unit 600 according to the sixth embodiment, a base plate 742 in a disc shape is provided on the rotation shaft 552 of the rotating and driving unit 550 and the diffusion plate 740 is disposed on the base plate 742 to incline relative to the same in the light source unit 700 according to the embodiment.

The plane of the base plate 742 is provided substantially normal to the optical axis C. The diffusion plate 740 is provided, for example, so as to be on the circumferential part of a surface 742a of the base plate 742 and to be annular along the circumferential direction. Furthermore, based on the characteristics of scattering reflection illustrated in FIG. 7, the diffusion plate 740 is disposed such that, when the incident light from the LD 110 is reflected on a diffusion plane 740a of the diffusion plate 740, the light rays large in reflection intensity out of the light thus reflected proceed along the optical axis C. Thereby, the part large in reflection intensity out of the light reflected with the diffusion plate 740 proceeds along the optical axis C to pass through the lens 130 and is incident on the reflection part of the partial transmission plate 120A to be guided in the emission direction of the light of the light source unit 700.

Such a configuration of the light source unit 700 can attain the light source unit 700 to be small, loss of the light in the partial transmission plate 120A can be small and illumination unevenness can be reduced. Moreover, the diffusion plate 740 is rotated by the rotating and driving unit 550, this enabling speckles and interference fringes effectively to be reduced.

<8. Eighth Embodiment>

Figure 15:
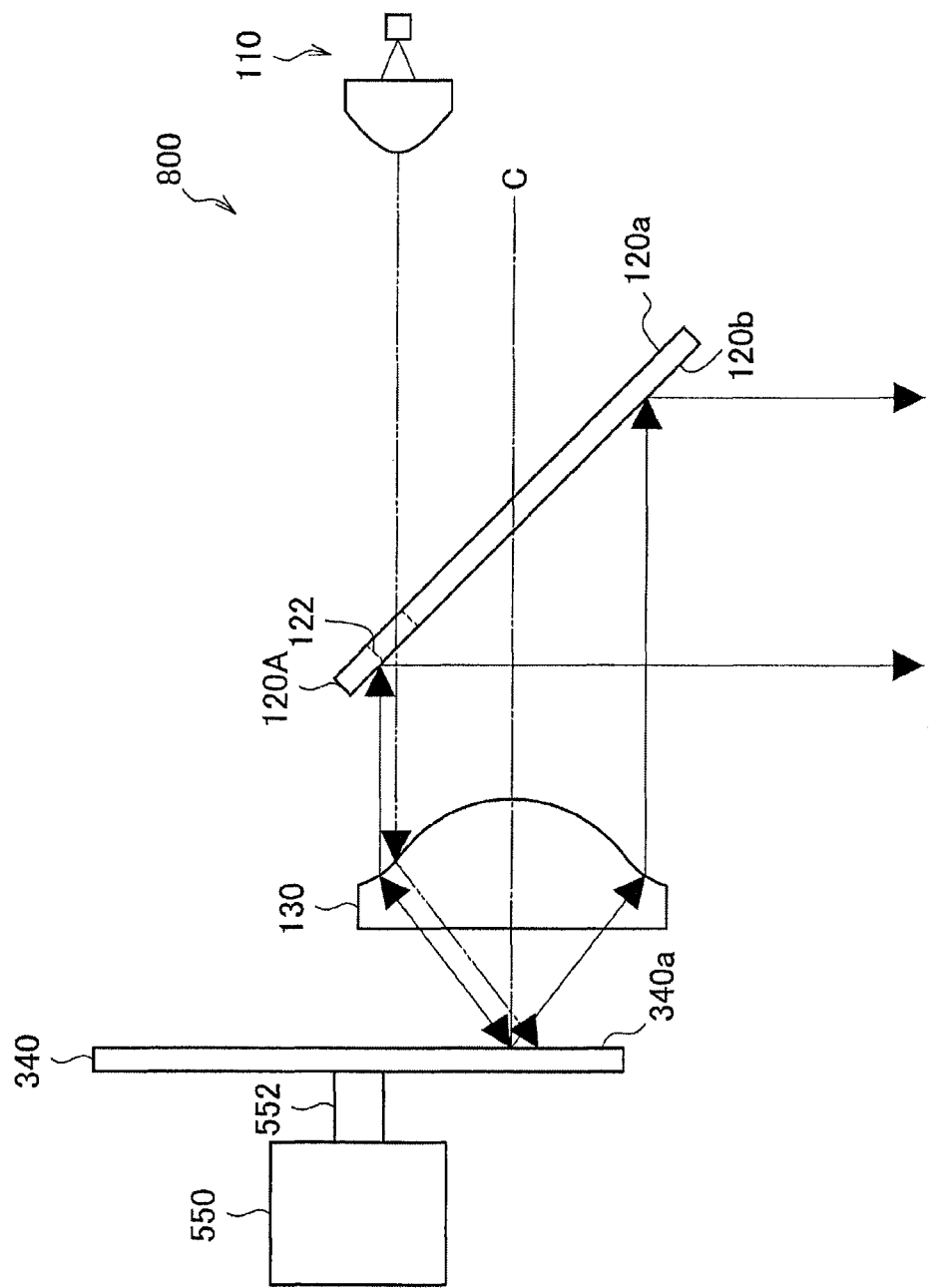
FIG. 15 is a schematic explanatory drawing illustrating one exemplary configuration of a light source unit according to an eighth embodiment of the present disclosure.

Next, based on FIG. 15, a light source unit 800 according to an eighth embodiment is described. In addition, FIG. 15 is a schematic configuration diagram illustrating the light source unit 800 according to the embodiment. The light source unit 800 according to the embodiment is different in the diffusion plate 340 having Ranbashian characteristics and being rotated by the rotating and driving unit 550 compared with the light source unit 300 according to the third embodiment. In the diffusion plate 340, as illustrated in FIG. 15, the rotation shaft 552 is fixed on the center part thereof and rotated by drive of the rotating and driving unit 550. The other constituents are configured and function similarly to those of the light source unit 300 according to the third embodiment illustrated in FIG. 8.

Use of the diffusion plate 340 having Ranbashian characteristics as above allows, still when the light from the LD 110 is incident obliquely on the diffusion plate 340, a part large in reflection intensity out of the reflected light on the diffusion plane 340a to proceed along the optical axis C. Then, the light rays large in reflection intensity pass through the lens 130 and are incident on the reflection part of the partial transmission plate 120A to be guided in the emission direction of the light of the light source unit 300. Thereby, loss of the light in the partial transmission plate 120A can be small and illumination unevenness can be reduced. Moreover, the diffusion plate 340 is rotated by the rotating and driving unit 550, this enabling speckles and interference fringes effectively to be reduced.

<9. Ninth Embodiment>

Figure 16:
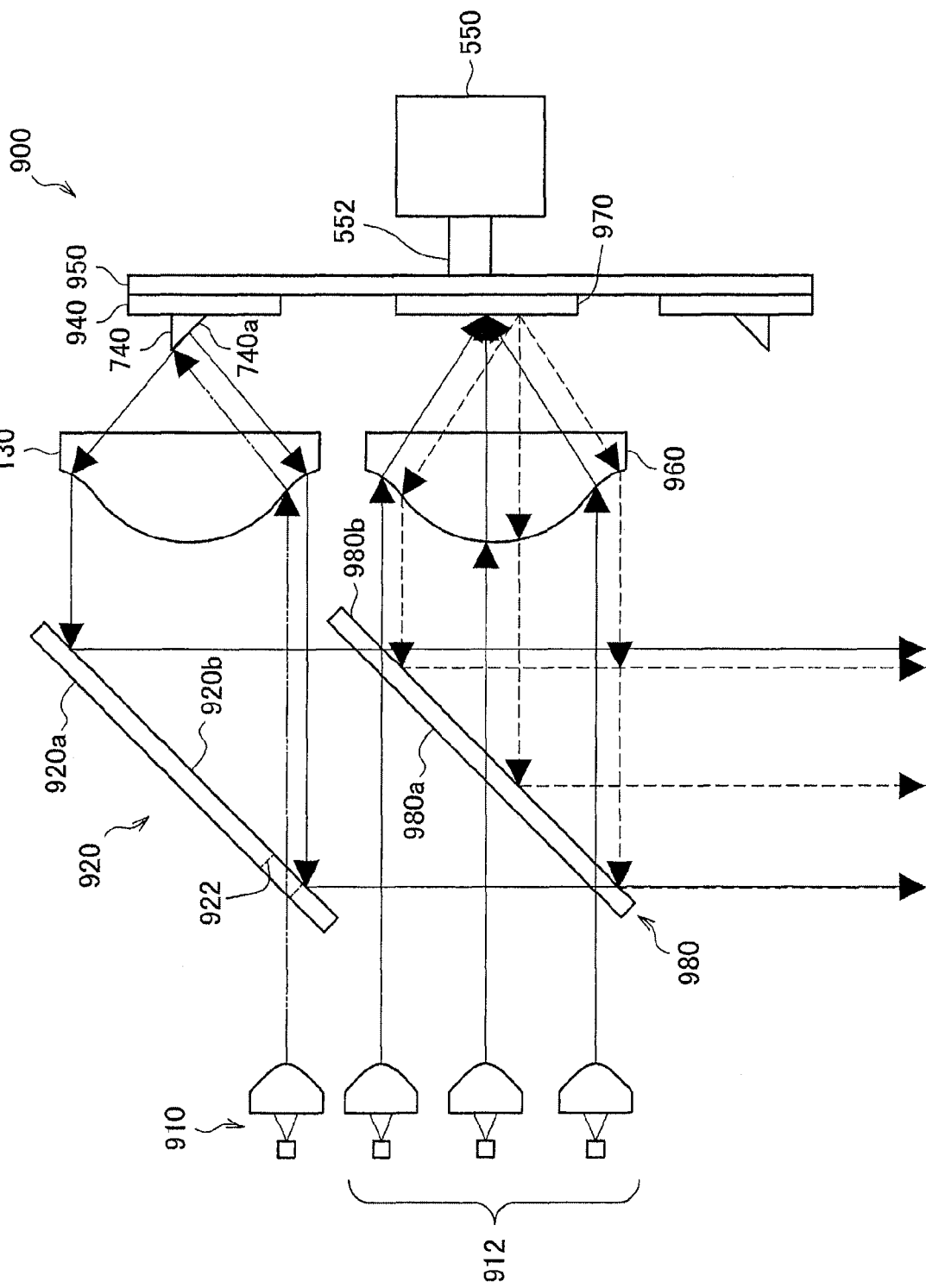
FIG. 16 is a schematic explanatory drawing illustrating one exemplary configuration of a light source unit according to a ninth embodiment of the present disclosure.
Figure 17:
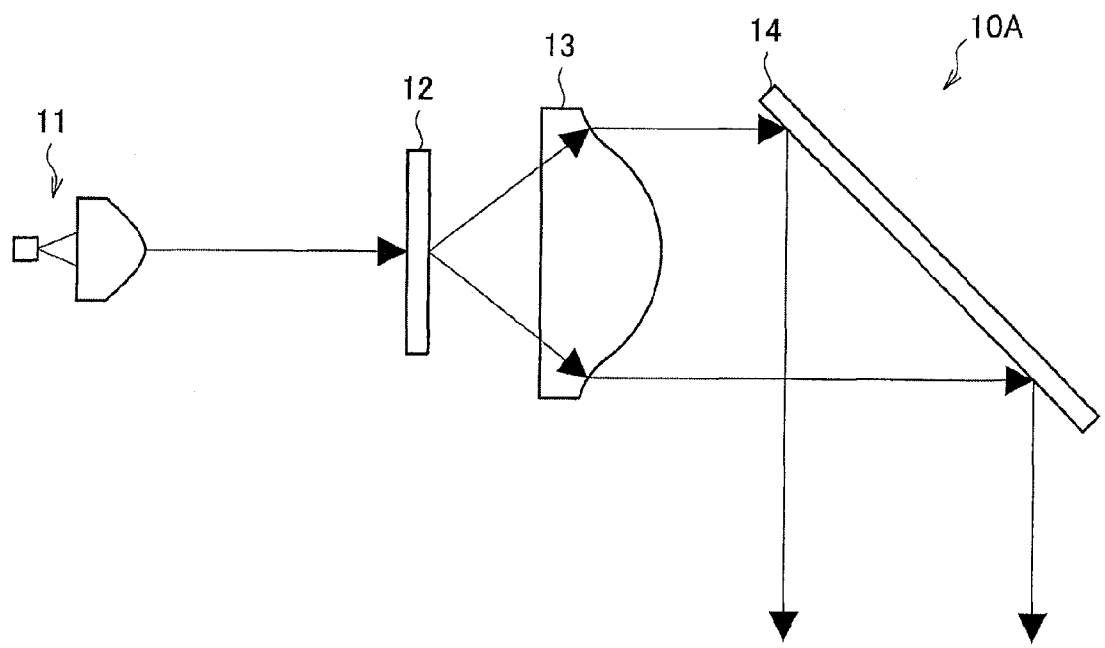
FIG. 17 is a schematic configuration diagram illustrating one exemplary configuration of a light source device using a transmissive diffusion plate according to the related art to the present disclosure.

Next, based on FIG. 16, a light source unit 900 according to a ninth embodiment is described. In addition, FIG. 16 is a schematic configuration diagram illustrating the light source unit 900 according to the embodiment. The light source unit 900 according to the embodiment is a light emitting unit utilizing light emitted by any of the light source units 100 to 800 described for the above-mentioned embodiments and fluorescent emission light emitted by exciting a fluorescent material. A combination of these allows the light source unit 900 to be small.

The light source unit 900 includes two light sources of a first light source 910 and a second light source 912. The first light source 910 emits light diffused and emitted from the light source unit 900 and is constituted, for example, of an LD. The second light source 912 emits light for exciting a fluorescent material 970 mentioned later and employs, for example, blue LDs.

First, as illustrated in FIG. 16, light emitted from the first light source 910 is incident on a first plane 920a of a partial transmission plate 920 and passes through an opening part 922 which is the transmission region to be incident on the diffusion plate 740 through the lens 130. The partial transmission plate 920, the lens 130 and the diffusion plate 740 are configured and function similarly to the partial transmission plate 120A, the lens 130 and the diffusion plate 740 according to the seventh embodiment illustrated in FIG. 14. In addition, the diffusion plate 740 is provided, via a base plate layer 940, on a wheel 950 in a disc shape on which the fluorescent material 970 mentioned later is provided. For example, as illustrated in FIG. 16, the diffusion plate 740 is provided on the circumferential part of the wheel 950 to be annular along the circumferential direction.

The light from the first light source 910 incident on the diffusion plate 740 is reflected on the diffusion plane 740a and passes through the lens 130 to be incident on a second plane 920b of the partial transmission plate 920. The second plane 920b of the partial transmission plate 920 reflects the incident light to guide toward a dichroic mirror 980.

Meanwhile, light emitted from the second light source 912 is incident on the dichroic minor 980 as illustrated in FIG. 16. The dichroic mirror 980 allows the light of the second light source 912 incident from a first plane 980a and the incident light from the partial transmission plate 920 to pass through. Moreover, the dichroic minor 980 reflects, on a second plane 980b, the fluorescent emission light from the fluorescent material 970 which is disposed opposite to the second light source 912 via the dichroic minor 980 and a lens 960 and the reflected light led from the second light source 912.

Accordingly, the light emitted from the second light source 912 passes through the dichroic minor 980 and is collected with the lens 960 for irradiation of the fluorescent material 970. The fluorescent material 970 is a fluorescent material, for example, based on YAG, and upon irradiation with light in the blue wavelength region from the second light source 912, absorbs the light to emit light in a wavelength region different from the blue wavelength region. For example, a fluorescent material emitting light in the green wavelength region or the red wavelength region is employed. For example, as illustrated in FIG. 16, the fluorescent material 970 is provided on the wheel 950 in a disc shape made of metal such as aluminum. Since the diffusion plate 740 is disposed on the circumferential part of the wheel 950, the fluorescent material 970 is provided, for example, in the center part of the wheel 950.

The wheel 950 is rotated by the rotating and driving unit 550 such as a motor about the rotation shaft 552 which is the rotation center and provided at the center of the wheel 950. The rotation of the wheel 950 prevents the wheel 950 from holding the heat due to the irradiation with the light, thus, causing a decrease of the light emission efficiency of the fluorescent material 970 and causing a melt of a resin used for adhesion of the fluorescent material 970 with the wheel 950. Moreover, the rotation of the wheel 950 also leads to the rotation of the diffusion plate 740, enabling speckles and interference fringes effectively to be reduced.

The fluorescent emission light emitted from the fluorescent material 970 passes through the lens 960 to be incident on the second plane 980b of the dichroic minor 980. The dichroic mirror 980 reflects the fluorescent emission light incident on the second plane 980b in the emission direction of the light of the light source unit 900. At this stage, on the first plane 980a of the dichroic minor 980, the diffused light which is led from the first light source 910 and reflected on the second plane 920b of the partial transmission plate 920 is also incident. The diffused light passes through the dichroic minor 980 and proceeds, along with the fluorescent emission light reflected on the second plane 980b, in the emission direction of the light of the light source unit 900.

As in the light source unit 900, a combination of the diffused light led from the light emitted from the first light source 910 and the fluorescent emission light emitted by exciting the fluorescent material 970 allows the light source unit 900 to be small and can attain the light with the balanced color gamut.

It should be understood by those skilled in the art that various modifications, combinations, sub-combinations and alterations may occur depending on design requirements and other factors insofar as they are within the scope of the appended claims or the equivalents thereof.

For example, the diffusion plate is moved by the rotating and driving unit 550 in the above-mentioned fifth to ninth embodiments, whereas the present technology is not limited to such examples. For example, reciprocal movement or vibration of the diffusion plate with a driving unit is also possible.

Moreover, for the above-mentioned embodiments, the diffusion plates which are configured to have roughness on the diffusion plane to reflect the light or to have Ranbashian characteristics are described, whereas the present technology is not limited to such examples. For example, a diffractive diffusion plate may be used. Such a diffusion plate can also reduce the amount of light passing through the transmission region of the partial transmission plate to be lost, this enabling the light amount incident on the reflection part to increase.

Additionally, the present technology may also be configured as below.

(1) A light source device including:
at least one light source configured to emit light;
a diffusion plate configured to diffuse and reflect the light emitted from the light source; and
a partial transmission member which is provided between the light source and the diffusion plate and has a transmission region which allows the light to pass through and a reflection region which reflects the light and is except the transmission region.

(2) The light source device according to (1),
wherein the transmission region of the partial transmission member is formed at a position on which the light emitted from the light source is incident.

(3) The light source device according to (1) or (2),
wherein the partial transmission member is disposed to incline relative to an optical axis which passes through a center of the partial transmission member and is parallel to an emission direction of the light of the light source so as to guide reflected light on the diffusion plate in an emission direction of light of the light source device.

(4) The light source device according to any one of (1) to (3),
wherein the light source and the transmission region of the partial transmission member are arranged on an optical axis which passes through a center of the partial transmission member and is parallel to an emission direction of the light of the light source, and
wherein a diffusion plane of the diffusion plate is provided to be normal to the optical axis.

(5) The light source device according to any one of (1) to (3),
wherein the light source and the transmission region of the partial transmission member are arranged at positions with a bias from an optical axis which passes through a center of the partial transmission member and is parallel to an emission direction of the light of the light source, and
wherein a diffusion plane of the diffusion plate is disposed to incline relative to the optical axis in a manner that light rays large in reflection intensity out of reflected light having the light from the light source reflected on the diffusion plane proceed on the optical axis.

(6) The light source device according to any one of (1) to (3),
wherein the light source and the transmission region of the partial transmission member are arranged at positions with a bias from an optical axis which passes through a center of the partial transmission member and is parallel to an emission direction of the light of the light source, and
wherein the diffusion plate has Ranbashian characteristics and a diffusion plane of the diffusion plate is provided to be normal to the optical axis.

(7) The light source device according to any one of (1) to (6),
wherein the diffusion plate is moved by a driving unit.

(8) The light source device according to any one of (1) to (7), further including:
a fluorescent material that emits fluorescent emission light different in wavelength region from light used for irradiation of the fluorescent material;
a second light source configured to emit the light used for irradiation of the fluorescent material; and
a combining unit that is disposed between the fluorescent material and the second light source, reflects light in a wavelength region of the fluorescent emission light emitted from the fluorescent material in a reflection direction of the light on the partial transmission member, and allows light in another wavelength to pass through.

(9) A display device including:
a light source unit;
a light modulating/combining system configured to modulate and combine incident light;
an illumination optical system configured to guide light emitted from the light source unit to the light modulating/combining system; and
a projection optical system configured to perform projection of an image emitted from the light modulating/combining system,
wherein the light source unit includes
at least one light source configured to emit light,
a diffusion plate configured to diffuse and reflect the light emitted from the light source, and
a partial transmission member which is provided between the light source and the diffusion plate and has a transmission region which allows the light to pass through and a reflection region which reflects the light and is except the transmission region.

What is claimed is:

1. A light source device, comprising:
   at least one light source configured to emit light;
   a diffusion plate that comprises an arrangement that is configured to diffuse and reflect the light emitted from the at least one light source; and
   a partial transmission member which is provided between the at least one light source and the diffusion plate and has a transmission region which is configured to allow the light emitted from the at least one light source to pass through and a reflection region which is configured to reflect the light reflected from the diffusion plate, and is except the transmission region,
   wherein the partial transmission member is disposed to incline relative to an optical axis which passes through a center of the partial transmission member and is parallel to an emission direction of the at least one light source so as to guide the reflected light from the diffusion plate in an emission direction of light of the light source device.

2. The light source device according to claim 1, wherein the transmission region of the partial transmission member is provided at a position on which the light emitted from the at least one light source is incident.

3. The light source device according to claim 1,
   wherein the at least one light source and the transmission region of the partial transmission member are arranged on the optical axis which passes through the center of the partial transmission member and is parallel to the emission direction of the light of the at least one light source, and
   wherein a diffusion plane of the diffusion plate is provided to be normal to the optical axis.

4. The light source device according to claim 1,
   wherein the at least one light source and the transmission region of the partial transmission member are arranged at positions with a bias from the optical axis which passes through the center of the partial transmission member and is parallel to the emission direction of the light of the at least one light source, and
   wherein a diffusion plane of the diffusion plate is disposed to incline relative to the optical axis in a manner that light rays large in reflection intensity out of the reflected light that has the light from the at least one light source reflected on the diffusion plane proceed on the optical axis.

5. The light source device according to claim 1,
wherein the at least one light source and the transmission region of the partial transmission member are arranged at positions with a bias from the optical axis which passes through the center of the partial transmission member and is parallel to the emission direction of the light of the at least one light source, and
wherein the diffusion plate has Ranbashian characteristics and a diffusion plane of the diffusion plate is provided to be normal to the optical axis.

6. The light source device according to claim 1, wherein the diffusion plate is moved by a driving unit.

7. The light source device according to claim 1, further comprising:
a fluorescent material configured to emit fluorescent emission light different in wavelength region from light used for irradiation of the fluorescent material;
a second light source configured to emit the light used for irradiation of the fluorescent material; and
a combining unit, disposed between the fluorescent material and the second light source, is configured to reflect light in a wavelength region of the fluorescent emission light emitted from the fluorescent material in a reflection direction of the light on the partial transmission member, and allow light in another wavelength to pass through.

8. A display device, comprising:
a light source unit;
a light modulating/combining system configured to modulate and combine incident light;
an illumination optical system configured to guide light emitted from the light source unit to the light modulating/combining system; and
a projection optical system configured to perform projection of an image emitted from the light modulating/combining system,
wherein the light source unit includes:
at least one light source configured to emit light,
a diffusion plate that comprises an arrangement that is configured to diffuse and reflect the light emitted from the at least one light source, and
a partial transmission member which is provided between the at least one light source and the diffusion plate and has a transmission region which is configured to allow the light emitted from the at least one light source to pass through and a reflection region which is configured to reflect the light reflected from the diffusion plate, and is except the transmission region,
wherein the partial transmission member is disposed to incline relative to an optical axis which passes through a center of the partial transmission member and is parallel to an emission direction of the at least one light source so as to guide the reflected light from the diffusion plate in an emission direction of light of the light source device.

9. The light source device according to claim 1, wherein the light undergoes diffuse reflection at a condensing point of the diffusion plate.

10. The light source device according to claim 9, further comprising:
a lens disposed between the diffusion plate and the partial transmission member.

11. The light source device according to claim 10, wherein the lens is configured to focus the light emitted from the at least one light source on the condensing point of the diffusion plate.

12. The display device according to claim 8,
wherein the light undergoes diffuse reflection at a condensing point of the diffusion plate.

13. The display device according to claim 12, further comprising:
a lens disposed between the diffusion plate and the partial transmission member.

14. The display device according to claim 13, wherein the lens is configured to focus the light emitted from the at least one light source on the condensing point of the diffusion plate.

* * * * *